United States Patent
Sol et al.

(10) Patent No.: US 8,888,071 B2
(45) Date of Patent: Nov. 18, 2014

(54) TRENCHLESS PIPE REPLACEMENT OF UNDERGROUND PIPE

(76) Inventors: Jonathan Sol, Oakland, CA (US); Roelof Sol, Oakland, CA (US)

(*) Notice: Subject to any disclaimer, the term of this patent is extended or adjusted under 35 U.S.C. 154(b) by 533 days.

(21) Appl. No.: 13/405,035

(22) Filed: Feb. 24, 2012

(65) Prior Publication Data
US 2013/0221296 A1    Aug. 29, 2013

(51) Int. Cl.
*H02G 1/08* (2006.01)

(52) U.S. Cl.
USPC ............................ 254/134.3 FT; 254/134.3 R (58) Field of Classification Search
USPC .................... 254/134.3 FT, 134.4, 134.3 R
See application file for complete search history.

(56) References Cited

U.S. PATENT DOCUMENTS

| | | | |
|---|---|---|---|
| 6,305,880 B1 * | 10/2001 | Carter et al. | 405/184.3 |
| 6,524,031 B2 * | 2/2003 | Carter et al. | 405/184.3 |
| 6,793,442 B2 * | 9/2004 | Carter et al. | 405/184.3 |
| 6,799,923 B2 | 10/2004 | Carter et al. | |
| 7,025,536 B2 | 4/2006 | Putnam | |
| 8,167,272 B2 * | 5/2012 | Roggenkamp et al. | 254/134.3 R |
| 2007/0048090 A1 | 3/2007 | Wentworth et al. | |
| 2012/0168699 A1 * | 7/2012 | Rachminov et al. | 254/134.3 FT |
| 2013/0221296 A1 * | 8/2013 | Sol et al. | 254/134.3 FT |

FOREIGN PATENT DOCUMENTS

GB    2469833    11/2010

* cited by examiner

*Primary Examiner* — Lee D Wilson
(74) *Attorney, Agent, or Firm* — Cislo & Thomas, LLP (57) ABSTRACT

The present invention comprises an improved cable puller assembly for use in the trenchless replacement of underground pipes including water, sewer and electrical conduits. The improved cable puller assembly utilizes a cylinder body comprising four double acting hydraulic cylinders set up in pairs of two, i.e. two forward cylinders and two aft cylinders. The cable pullers are configured to move inwardly and outwardly from the cylinder body and feature the ability to pull a cable through a pipe on both their inward and outward strokes.

20 Claims, 9 Drawing Sheets

TRENCHLESS PIPE REPLACEMENT OF UNDERGROUND PIPE

FIELD OF THE INVENTION

The invention relates generally to systems for use in the trenchless removal of underground pipe, and more particularly, to systems which use hydraulic cylinders as the cable puling device.

BACKGROUND OF THE INVENTION

The underground location of water and sewer lines, as well as electrical conduits, makes their replacement difficult. This is particularly so where additional infrastructure has been developed around or on the previously built underground lines or conduits. Often such lines were installed via open trenches years ago and now they cannot be easily re-excavated. Over the years, new developments, such as roads, parking lots, buildings, or landscaping have been placed over the surface of the old lines, thus making re-excavation impossible or unacceptably costly.

Numerous methods have been developed over the years to address the problem of how to replace worn out water and sewer lines without excavating the lines. Typically, such methods will replace the older iron or steel lines with a new line made from a flexible plastic material. One such method, of which this invention is an improvement, is called pipe bursting.

Pipe bursting methods for replacing old, typically metal, water, sewer, or electrical conduit lines make use of a conical shaped mole that is pulled through an existing pipe. The mole is shaped such that it is smaller than the inside diameter of the old pipe at one end of the mole and larger than the inside diameter of the pipe at the other end of the mole, and thus, the mole causes the original pipe to be burst or fractured upon the mole being pulled through the pipe. The original pipe is burst outward radially. Typically, attached to the back of the mole is a length of flexible replacement piping which is drawn into the space formerly occupied by the burst pipe and therefore takes the place of the original. Thus, the new pipe replaces the old pipe without excavating along the entire length of the pipe being replaced. Excavation is required typically only at the ends of the pipe to be replaced.

The basic components of prior art pipe bursting systems include a mole, a length of cable engageable to the mole, a cable pulling device, and a mounting structure for supporting the cable pulling device against an opening through which the mole is to be pulled. In order to pull a mole through an iron pipe, pulling force on the order of 15-75 tons may be required. To provide sufficient pulling force, many prior art pipe bursting processes have used winches of various types. U.S. Pat. No. 5,328,297 to Handford is one example of such a device. However, winches of sufficient size to generate 75 tons of pulling force typically weigh several tons themselves and are frequently mounted on trucks or are attached to other large excavation devices. In some applications, space limitations prevent the use of a winch as the source of pulling force.

Due to the relatively large size of a winch suitable for pulling a mole through an iron or steel pipe, efforts have been made to find smaller devices capable of generating the necessary pulling force. These devices typically make use of the high force that can be generated by relatively compact hydraulic cylinders. Such devices are exemplified by U.S. Pat. No. 6,305,880 to Carter et al ("the Carter patent"). The Carter patent uses a pair of single acting hydraulic cylinders as the cable pulling device. The cylinders are are sufficiently small that the puller, along with a pulling frame, can be used by one or two operators and represents an improvement in the art over a winch based system.

The pulling device of the Carter patent however, nevertheless suffers from certain drawbacks. One drawback of the Carter device is that because the device uses single acting hydraulic cylinders, it has a relatively slow cycle time. Another drawback of the Carter device is that to prevent the cable from rebounding back into the pipe to be burst, the device requires additional hardware to hold the pulling cable stationary while the hydraulic cylinders make their return stroke.

Accordingly, there persists a need in the in art of trenchless pipe replacement for an improved cable pulling device that does not suffer the aforementioned drawbacks. Preferably, such a device would be smaller than the prior art winch-type devices, yet have a substantially faster cycle time than prior art hydraulic devices. A faster acting device would be more cost efficient for contractors and thus would reduce the time and cost of trenchless pipe replacement work.

SUMMARY OF THE INVENTION

The present invention comprises an improved cable puller for the trenchless replacement of underground pipes including water, sewer, and electrical conduits. The cable puller of the present invention improves upon prior art hydraulic cable pullers. Unlike the single-acting pullers of the prior art which pull only on their outward stroke and do little, or no, useful work on their inward or recovery stoke, the present invention cable puller pulls continuously on the cable on both the device's outward and inward strokes and therefore doubles the speed at which a mole may be pulled through a pipe to be burst. Moreover, because the device pulls the cable on both its inward and outward strokes, the present invention puller has no need for a mechanism to hold the cable stationary during the return stroke as is required by the prior art. Such a device however, may be provided with the present invention puller for added safety.

The present invention double acting cable puller comprises a cylinder body which houses four hydraulic cylinders. The cylinder body has a forward end and an aft end. One pair of hydraulic cylinders operates in tandem on the forward end of the cylinder body and another pair of cylinders operates in tandem on the opposite, aft end of the cylinder body. Each of the hydraulic cylinders houses one double acting piston and piston rod, and each cylinder has its own inlet and outlet ports for hydraulic fluid. For each set of paired forward and aft cylinders, the cylinder rods are attached to a puller, and each puller has a set of jaws for engaging the pulling cable.

In operation the present invention cable puller is securely attached to a pulling base designed for use with the puller. During phase I in the operation cycle, pressurized hydraulic fluid is directed into each of the paired cylinders so that pressure bears on the outward faces of the pistons (the faces opposite the rods) causing both the forward and aft pullers to travel outward away from the cylinder body until the cylinders' maximum length of travel has been reached. During this phase, the aft puller's jaws engages the cable so that the cable is displaced (i.e. the mole is pulled through the pipe to be burst) as the aft puller travels away from the cylinder body. During this phase, the forward puller's jaws are not engaged with the cable and therefore the cable simply passes freely through the forward jaws.

During phase II of the present invention cable puller's operation, pressurized hydraulic fluid is redirected into the cylinders so pressure bears upon the outward faces (i.e. the faces on the same side as the rods) so that both pullers travel inward towards the cylinder body. During this phase, the two pullers have alternated tasks: the forward puller's jaws are now engaged the cable and now pull the cable through the pipe to be burst, while the aft puller's jaws have released the cable, allowing cable to pass freely between them. The cycle repeats continuously until the mole is pulled through the length of pipe to be burst.

DETAILED DESCRIPTION OF THE INVENTION

Figure 1:
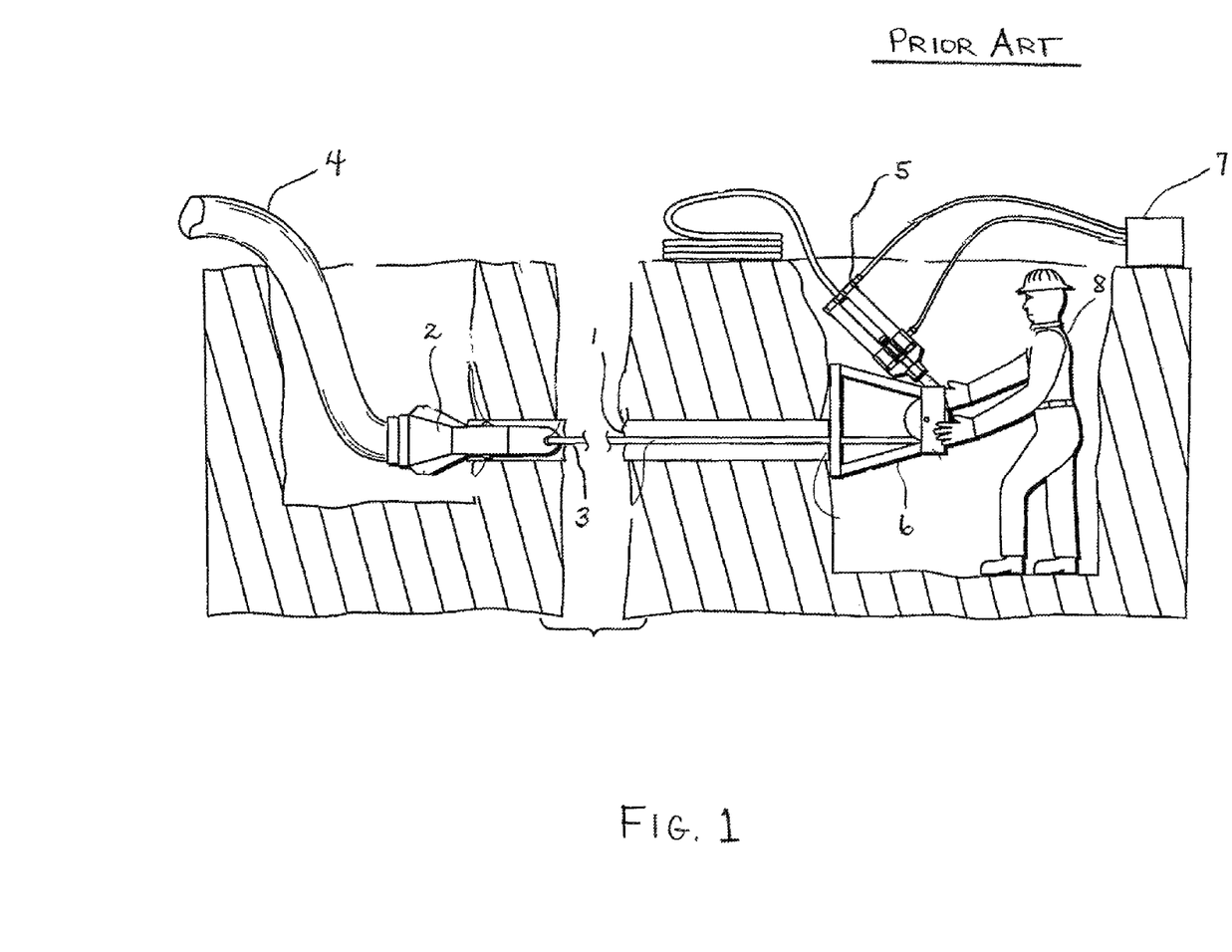
FIG. 1 shows a typical prior art system for trenchless pipe replacement using hydraulic cylinders as the force for pulling a mole attached to a cable through a pipe to be burst.

With reference to FIG. 1, it has long been known in the art that an old pipe 1, i.e. water, sewer, or electrical conduit, can be replaced by pulling a mole 2 via a cable 3 through the pipe to be burst 1, and thereby bursting the pipe in a radially outward direction. Typically, a length of flexible plastic pipe 4 is drawn through the burst pipe 1 and thereby takes the place of the burst pipe 1. Prior art systems require a means for generating the pulling force on the cable 1 and this means has typically been supplied by winches (not shown) or by a hydraulic cylinder-based cable puller 5. Hydraulic cylinder-based cable pulling systems further require a pulling frame 6 that faces an opening in the pipe to be burst 1 through which the cable 3 may be drawn. Such systems further require a source of pressurized hydraulic fluid 7 and at least one operator 8. As noted in the background section, prior art systems pull the cable only on their outward stroke.

Figure 2:
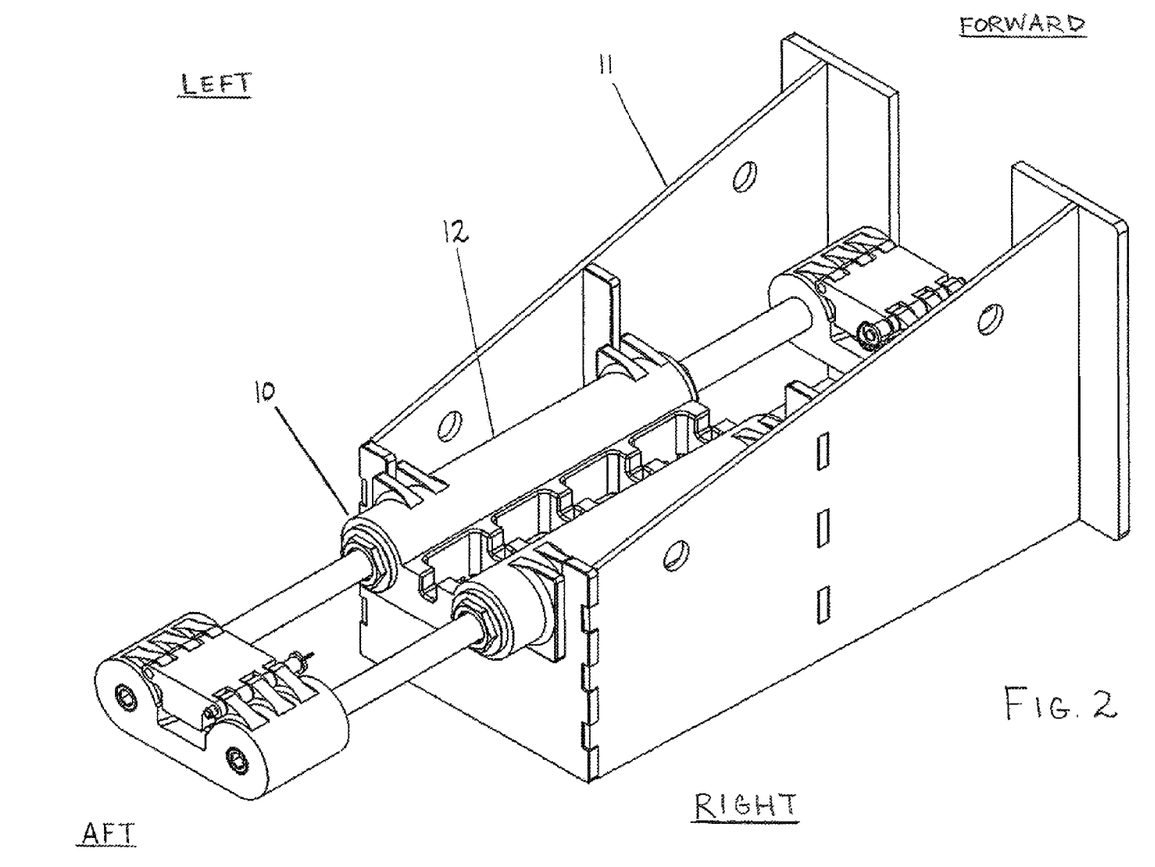
FIG. 2 shows the cable puller assembly of the present invention mounted on a pulling base configured to receive the cable puller.

Referring to FIG. 2, the present invention improves upon the prior art by providing a double-acting hydraulic cable puller 10, where both the inward and outward strokes of the cable puller, pull the cable 3 through the pipe to be burst 1. With reference to FIG. 2, the double acting cable puller 10 of the present invention is shown attached to a pulling base 12. For purposes of description, the puller 10 has a forward end and an aft end as indicated in FIG. 2, a right hand side and a left hand side as indicated in FIG. 3.

Figure 3:
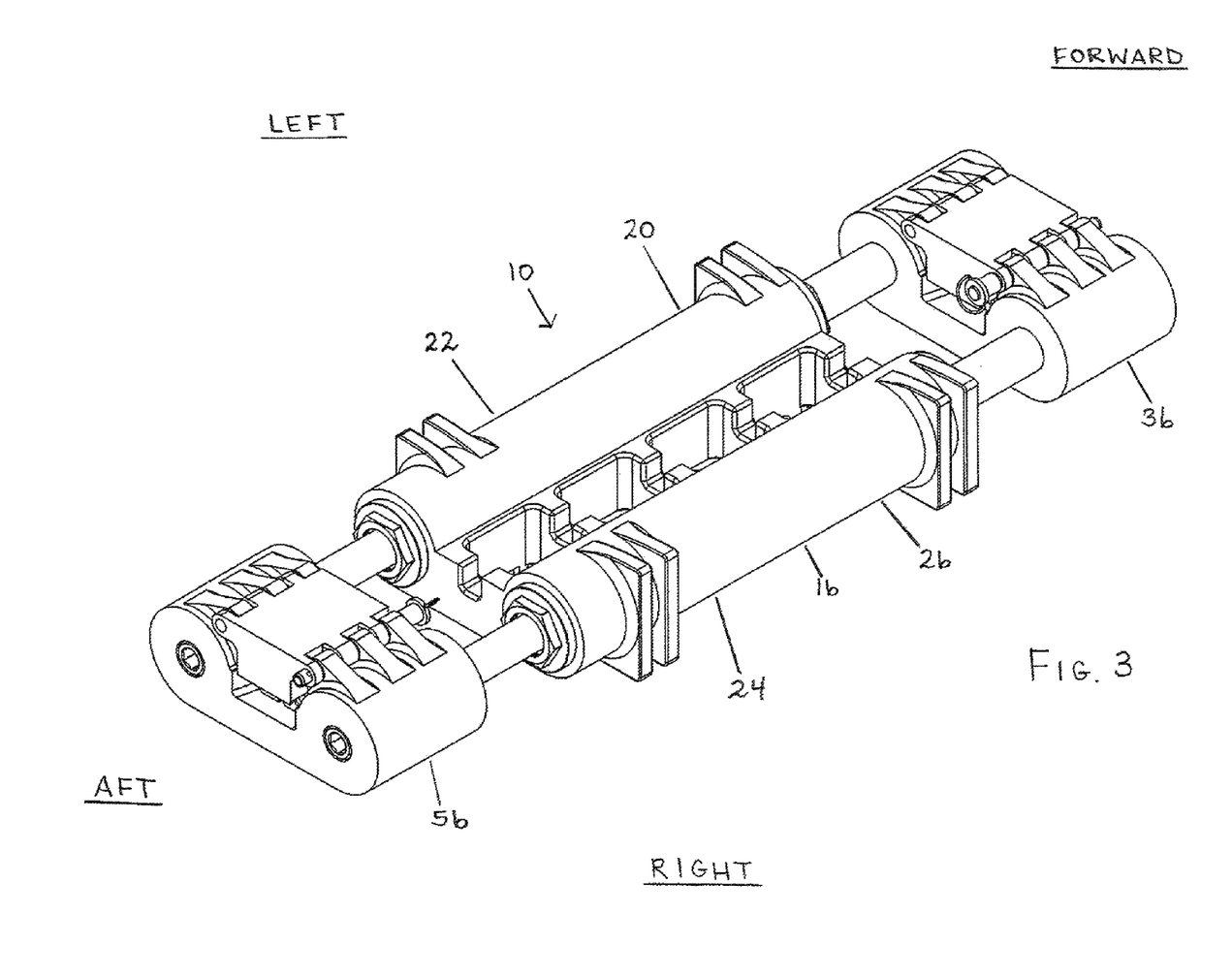
FIG. 3 shows the cable puller assembly of the present invention, removed from the pulling base, with the pullers shown in their retracted position.
Figure 4:
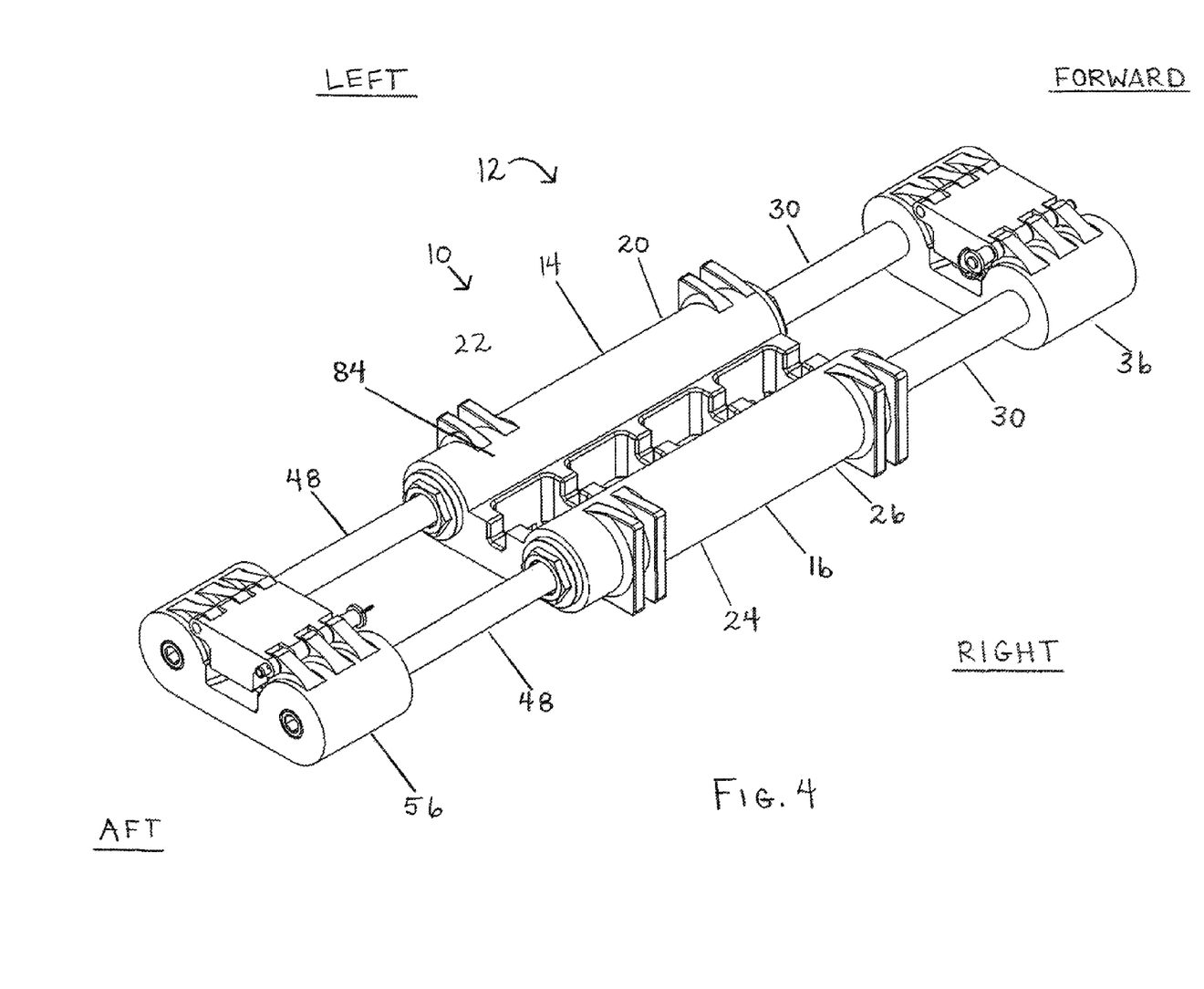
FIG. 4 shows the cable puller assembly of FIG. 3 with the pullers in their extended position.
Figure 5:
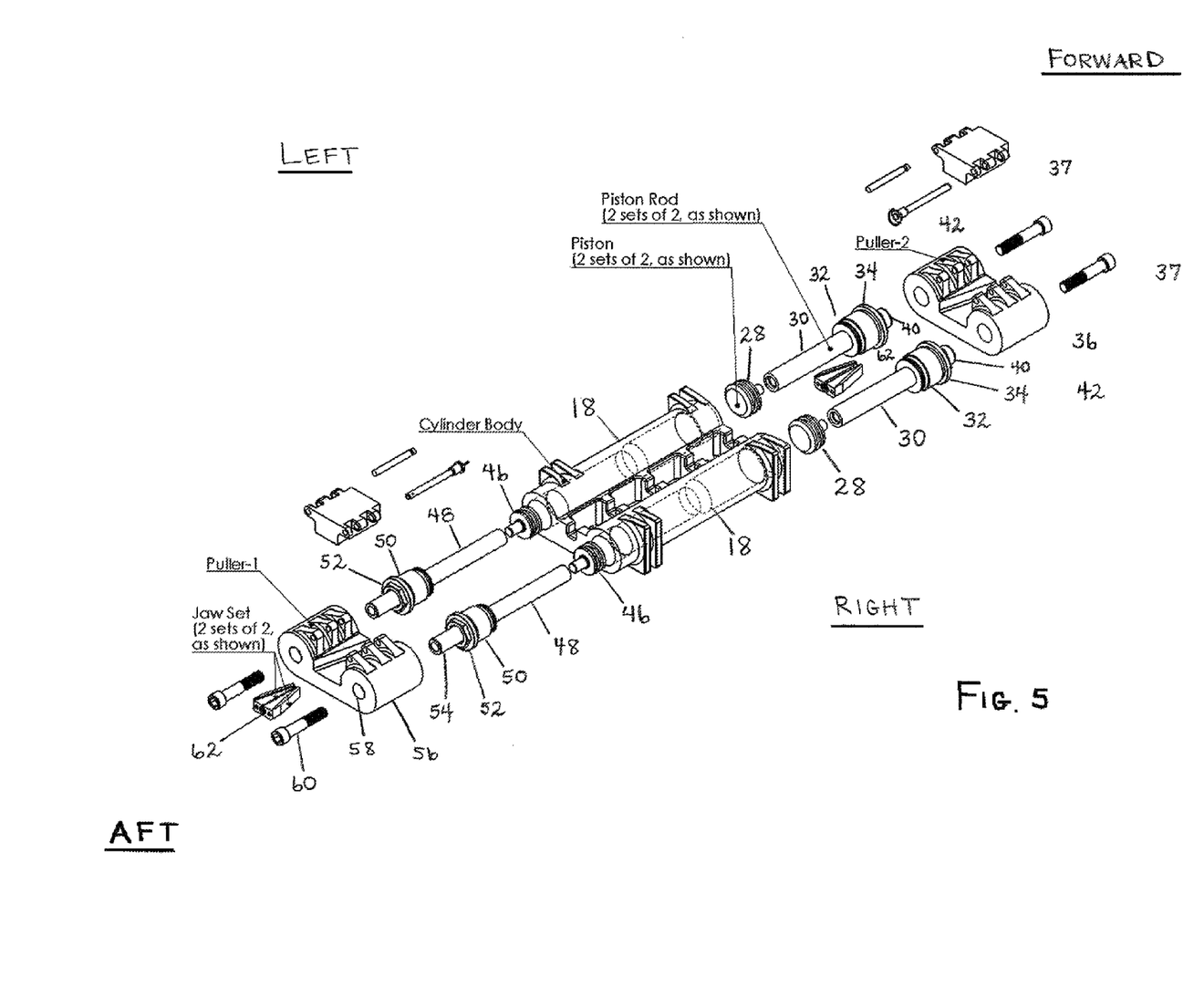
FIG. 5 shows an exploded view of the cable puller assembly of the present invention.

Referring now to FIGS. 3-5, the cable puller of the present invention comprises a cylinder body 12 which houses four hydraulic cylinders, two opposed cylinders 24 and 26 are located in a right hand pressure tube 14 and two opposed cylinders 20 and 22 are in a left hand pressure tube 16. Each of the pressure tubes 14 and 16 features an internal wall 18 (see FIG. 5) in the center of the tubes. The internal wall 18 functions to split each tube (14, 16) into the opposed, independently acting hydraulic cylinders. Therefore, pressure tube 14 on the left hand side includes opposed hydraulic cylinders 20 and 22, while pressure tube 16 on the right hand side includes opposed hydraulic cylinders 24 and 26.

Referring now to FIGS. 4 and 5, the forward hydraulic cylinders 20 and 26 feature pistons 28, piston rods 30, seals 32 and end caps 34. Each rod 30 features an end portion 40 which extends beyond the end cap 34. The end portions 40 of the piston rods 30 are internally threaded to accept cap screws 37. The end portion 40 of each piston 30 mates in a slip fit within holes 42 bored through a forward puller 36. Included in the bores 42 of the forward puller 36 are steps 44 (see FIG. 6) which allow the piston rods 30 to be drawn up tightly, or rigidly attached to, the aft puller 36 via the cap screws 37.

With continued reference to FIGS. 4 and 5, similar to the forward hydraulic cylinders 20 and 26 of the present invention cable puller 10, the aft hydraulic cylinders 22 and 24 also feature pistons 46, piston rods 48, seals 50 and end caps 52. Each rod 48 also features an end portion 54 which extends beyond the end cap 52. The end portions 54 of the piston rods 48 are internally threaded to accept cap screws 60. The end portion 54 of each piston rod 48 mates in a slip fit within holes 58 bored through an aft puller 56. Included in the bores 58 of the aft puller 56 are steps 44 (see FIG. 6) which allow the piston rods 48 to be drawn up tightly, or rigidly attached to, the aft puller 57 via the cap screws 60.

With continued reference to FIGS. 3 through 5, the forward hydraulic cylinders 20 and 26 are larger and have a shorter stroke than the aft cylinders 22 and 24. This is necessary so that the forward and aft pullers 36 and 56 will reach their maximum points of extension and retraction at the same time. The forward and aft pullers can only reach their maximum points of extension and retraction at the same time if both the forward pair of cylinders and the aft pair of cylinders receive an equal volume of hydraulic fluid on their forward and return strokes. Consequently, the pistons 28, rods 30, seals 32 and end caps 34 of the forward hydraulic cylinders 20 and 26 are larger than the corresponding pistons 46, rods 48, seals 50 and end caps 52 of the aft hydraulic cylinders 22 and 24, in order to accomplish this goal.

As noted, two double-acting forward, 20 and 26, and aft 22 and 24, pairs of cylinders are responsible for the actuation of the cable puller 10. The forward cylinders (20 and 26) control the forward puller 36, while the aft pair of cylinders (22 and 24) control the aft puller 56. Pressurized hydraulic fluid is forced into each of the forward (20 and 26) and aft (22 and 24) cylinder pairs on the appropriate side of their pistons to cause simultaneous extension or retraction of the forward and aft pullers 36 and 56. To cause the cylinders to extend, fluid is forced against the outward piston faces 29 (i.e. the faces opposite the rods). To cause the cylinders to retract, fluid is forced against the inward piston faces 31 (i.e. the faces on the same side as the rods).

An operational constraint is that each of the forward (22 and 26) and aft (22 and 24) cylinder pairs must receive an equal volume of fluid. Receiving an equal volume of fluid is required because the cylinder pairs are opposed, i.e. one pair will receive fluid against the open-face side 29 of their pistons while at the same time the other pair will receive fluid against the side of their pistons to which the cylinder rod attaches 31. Essentially, during any given phase in the cable puller's operation, one pair of cylinders will have its volume consumed by fluid only, and the other pair will have its volume consumed both by fluid and the cylinder's rods. This constraint dictates that the cylinder pairs must be dimensionally different. Specifically, the cylinder pairs must differ in cylinder diameter, rod diameter, and travel distance. For any particular size of cable puller, the above parameters must be adjusted to achieve an equal volume of fluid in each cylinder pair.

Figure 6:
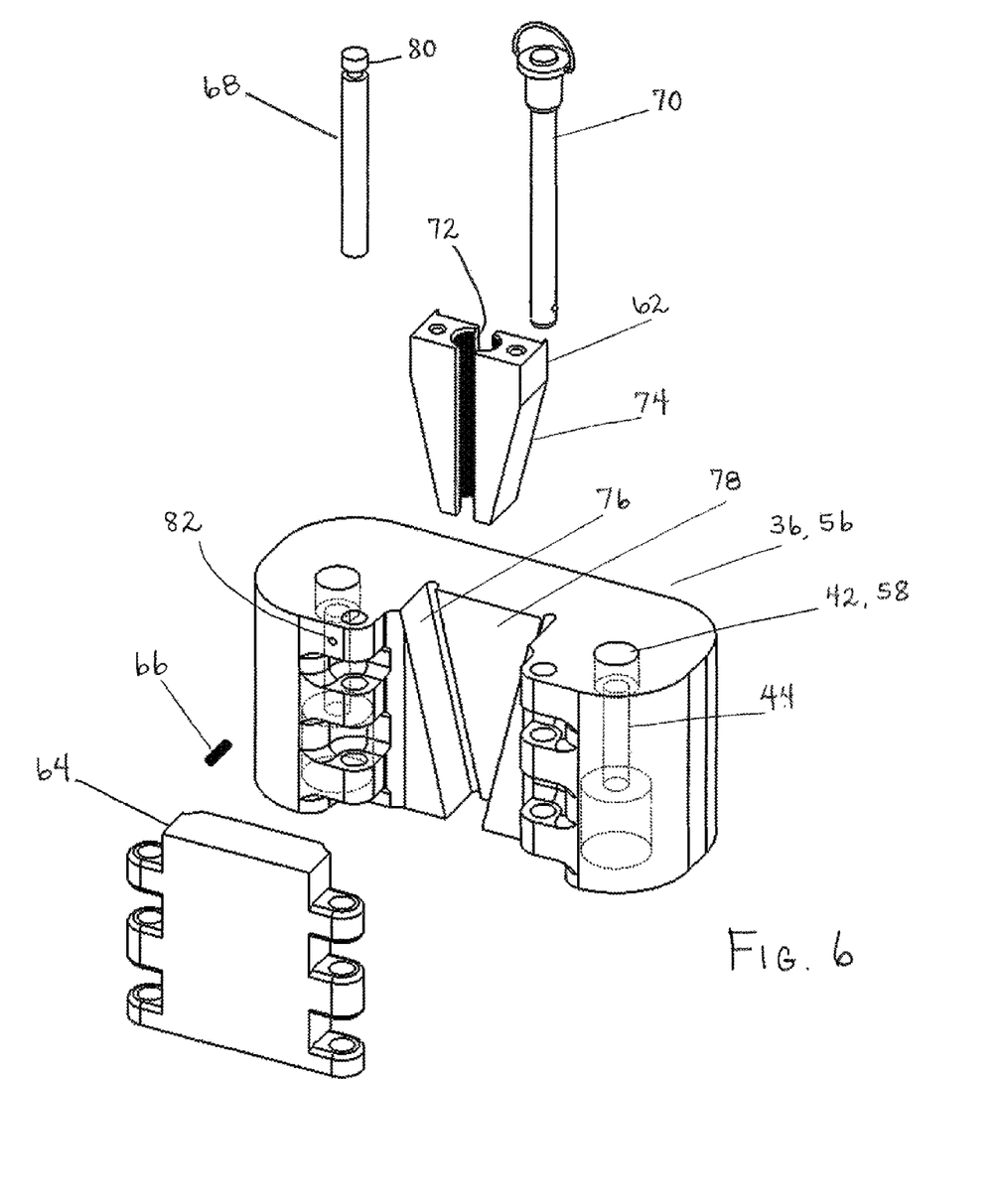
FIG. 6 shows an exploded view of a puller of a cable puller of the cable puller assembly of the present invention.
Figure 7:
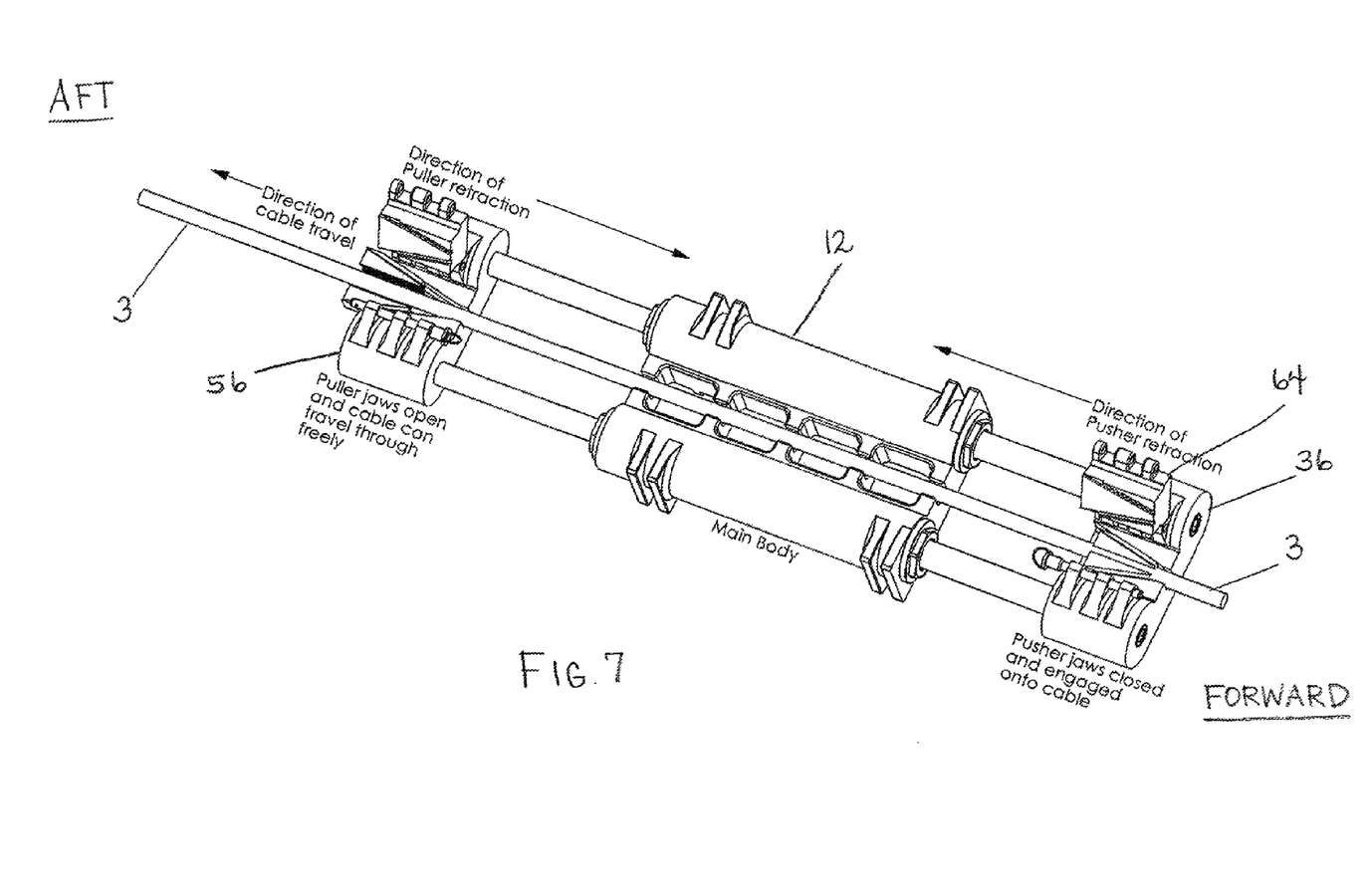
FIG. 7 shows a perspective view of the cable puller assembly of the present invention, indicating the direction of cable movement when the pullers are in their extended position and beginning a retraction stroke.
Figure 8:
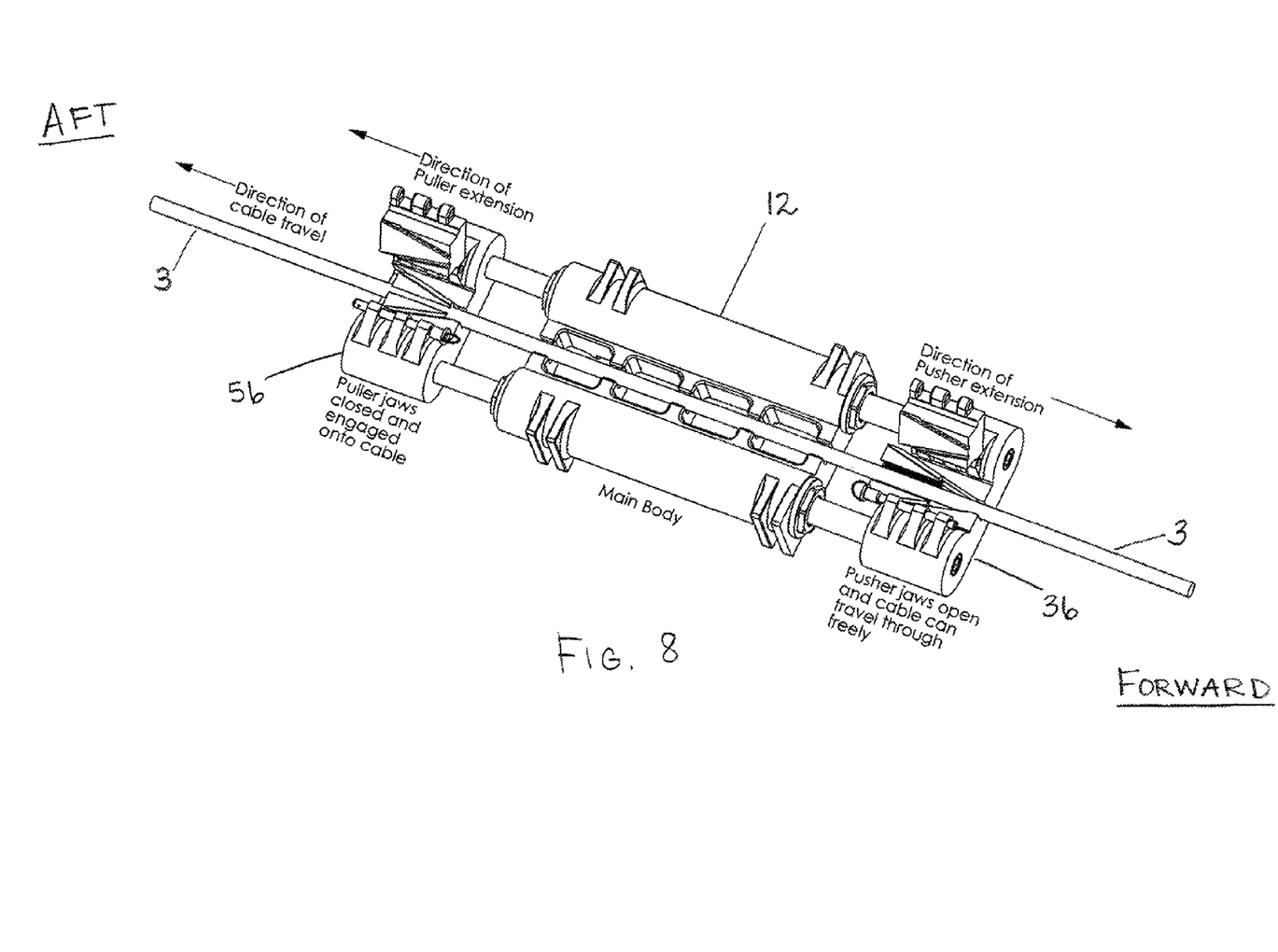
FIG. 8 shows a perspective view of the cable puller assembly of the present invention, indicating the direction of cable movement when the pullers are in their retracted position and beginning an extension stroke.

Referring now to FIGS. 3-5 and particularly FIG. 6, the pullers 36 and 56 of the present invention cable puller 10 will be described. The pullers are identical in function and are essentially identical in physical structure with the exception that bores 42 and 58 of the forward and aft pullers are sized differently to correspond to the differently sized piston rods to which they mate. That is, the bores 42 of the forward puller 36 are sized to mate with the rods 30 of the forward cylinders 20 and 26, while the bores 58 of the aft puller 48 are sized to mate with the rods 48 of the aft cylinders 22 and 24, the rods of the forward and after cylinders being of different sizes. In all other respects, the forward and aft pullers are identical.

Each of the forward and aft pullers feature sliding jaws 62. Each jaw 62 includes serrations 72. The serrations 72 are designed to grasp or clamp onto the pulling cable 3 (see FIG. 1). Each jaw 62 has a V-shaped surface 74. The V-shaped surface of the jaws 62 slidably mate with V-shaped surfaces 76 of the centrally located V-section 78 on the puller 36, 56. The sliding interaction of V-shaped surfaces 74 of the jaws 62 with the mating V-shaped surfaces on the puller 36, 56 are such that when the puller moves in a direction opposite to that of the narrow portion of the V-section 78, the jaws 62 clamp down on the cable 3 and pull the cable in the direction of the puller. Likewise, when the puller 36, 56 moves in the same direction of the narrow portion of the V-section 78, the jaws do not clamp down on the cable, but rather remain loose and thereby, the cable passes freely through the jaws.

To allow for easy insertion of the pulling cable 3, each puller has a cable access door 64 which is hinged to the puller(s) 36, 56. The hinge is fixedly held in place on one side by a hinge pin 68 which includes a groove 80. To retain the hinge pin 68 in place, a roll pin 66 passes through groove 80 in pin 68 and passes partially into a hole 82 formed into the puller(s) 35, 56. On an opposite side, the cable access door is held in place by a ball-lock-pin 70. The ball-lock pin 70 allows the cable door to be readily opened to accept a pulling cable, and just as easily closed. This feature of the present invention cable puller 10 is desirable because it creates a closed cable path through the puller and therefore increases the puller's safety over prior art devices which may allow a cable under tension to slip out of the puller in the event an operator were to lose control of the device.

Ball-lock-pin 70 actuated cable doors 64 equipped with cable jaws 62 are located on both the forward 36 and aft 56 cable pullers. Optionally, a stationary puller 84 is may be located on the cylinder body 12. The optional stationary puller is a safety mechanism and only activates to prevent cable rebound in the event one of the puller assemblies 36, 56 fails.

Operation of the Cable Puller of the Present Invention

Figure 9:
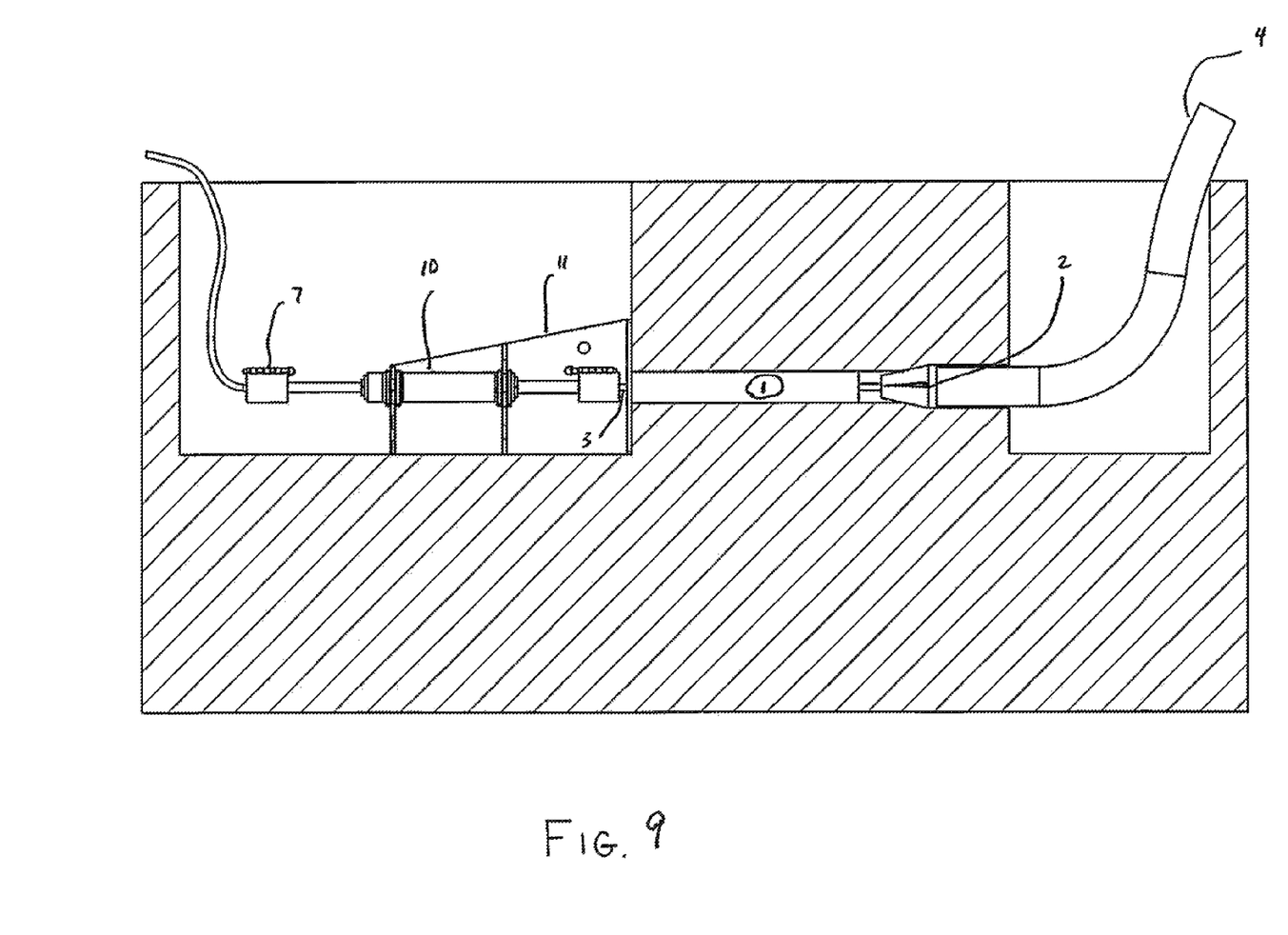
FIG. 9 shows the present invention cable puller installed in an excavation, pulling a mole and new replacement pipe through a pipe to be burst.

With reference to FIG. 9, prior to beginning operation, if necessary, excavations are made at each end of the pipe to be burst 1. A pulling cable 3 is then run the full length the pipe to be burst 1. A mole 2 having an eyelet or other means for cable attachment at one end, of which many prior art designs exist, is connected at the eyelet end to the pulling cable 3. Replacement piping 4 is attached to the other end of the mole 2. The present invention cable puller 10 is than attached a pulling base 11 specifically designed for use with the new puller. The new cable puller 10 is then connected to a source of pressurized hydraulic fluid 7. (Sources of pressurized hydraulic fluid are well known to those of skill in the art.) The ball-lock-pins 70 are pulled which allows the cable doors 64 to be opened and the cable to be pulled to be inserted into the present invention cable puller 10. (See FIGS. 5-8.)

Referring to FIGS. 3-4 and 7-8, during phase I in the operation cycle, pressurized hydraulic fluid is directed into the forward (20 and 26) and aft (22 and 24) cylinders so that both pullers travel outwardly away from the cylinder body 12 until the cylinders' maximum travel point has been reached. (See FIGS. 4 and 7.) During this phase, aft puller's 56 jaw set 62 engages the cable 3 so that the cable is displaced (i.e. pulled through the pipe to be burst) as the aft puller 56 travels away from the cylinder body 12. At this time, the forward puller's 36 jaws are not engaged with the cable 3 and therefore the cable simply passes freely through the forward puller's jaws 62.

During phase II of the cable puller's 10 operation, pressurized hydraulic fluid is redirected into the cylinders (20 and 26) and (22 and 24) so that both pullers (36 and 56) travel inwardly towards the cylinder body 12. (See FIGS. 3 and 8.) During this phase the two pullers have alternated tasks, the forward puller's jaws have engaged the cable and now pull the cable 3 through the pipe to be burst 1, while the aft puller's jaws have released the cable and cable passes freely between them. The cycle repeats continuously until the mole 2 is pulled through the length of pipe to be burst 1.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention, which do not depart from the spirit and scope of the foregoing specification and drawings, and of the claims appended below, are possible and practical. It is intended that the claims cover all such modifications and alternative embodiments.

What is claimed is:

1. A cable pulling device for use with a cable and a mole in the trenchless replacement of underground pipe, comprising:
   a cylinder body;
   the cylinder body containing a forward set of double-acting pistons and an aft set of double acting pistons;
   a forward puller attached to the forward set of double-acting pistons;
   an aft puller attached to the aft set of double acting pistons; and
   wherein the aft and forward pullers each contain a pair of cable engaging jaws.

2. The cable pulling device of claim 1, wherein the double-acting pistons are configured to move the pullers simultaneously inwardly on an inward stroke and outwardly on an outward stroke.

3. The cable pulling device of claim 2, wherein the cable engaging jaws on the forward puller engage and pull the cable through the pipe on the inward stroke and wherein the cable passes freely through the cable engaging jaws of aft puller on the inward stroke.

4. The cable pulling device of claim 2, wherein the cable engaging jaws on the after puller engage and pull the cable through the pipe on the outward stroke and wherein the cable passes freely through the cable engaging jaws of forward puller on the outward stroke.

5. The cable pulling device of claim 2, wherein the forward and aft double acting cylinders are configured to move the forward and aft cable pullers simultaneously inwardly to reach a point of maximum retraction at the same time.

6. The cable pulling device of claim 1, wherein the forward and aft double acting cylinders move the forward and aft pullers simultaneously outwardly to reach a point of maximum extension at the same time.

7. The cable pulling device of claim 1, wherein each puller has a hinged door under which reside the cable engaging jaws, wherein the door may be swung open to install the cable to be pulled and may be closed and locked into place thereafter.

8. The cable pulling device of claim 7, wherein the puller door locking device comprises a ball lock pin.

9. The cable pulling device of claim 1, wherein the double acting cylinders are activated by pressurized hydraulic fluid.

10. A cable pulling device for use with a cable and a mole in the trenchless replacement of underground pipe, comprising:
 a cylinder body including right and left pressure tubes, each pressure tube having an interior wall at about the midpoint of the tube, wherein each pressure tube is split into a forward and an aft cylinder;
 each cylinder being equipped with rods and pistons, the rods and pistons sized such that the forward pistons and the aft pistons each reach their maximum point of inward retraction and outward extension at the same time;
 a forward puller attached to the forward set of double-acting pistons;
 an aft puller attached to the aft set of double-acting pistons; and
 wherein the aft and forward pullers each contain a pair of cable engaging jaws.

11. The cable pulling device of claim 10, wherein the double-acting pistons are configured to move the pullers simultaneously inwardly on an inward stroke and outwardly on an outward stroke.

12. The cable pulling device of claim 11, wherein the cable engaging jaws on the forward puller engage and pull the cable through the pipe on the inward stroke and wherein the cable passes freely through the cable engaging jaws of aft puller on the inward stroke.

13. The cable pulling device of claim 11, wherein the cable engaging jaws on the aft puller engage and pull the cable through the pipe on the outward stroke and wherein the cable passes freely through the cable engaging jaws of the forward puller on the outward stroke.

14. A cable pulling device for use with a cable and a mole in the trenchless replacement of underground pipe, comprising:
 a cylinder body;
 the cylinder body containing a forward set of double acting pistons and an aft set of double acting pistons;
 the forward and aft sets of double-acting pistons being sized such that the forward and the aft pistons each contain an equal amount of fluid volume during operation of the cable puller, wherein the forward and aft sets of double acting cylinders reach their maximum points of extension and retraction at the same time;
 a forward puller attached to the forward set of double-acting pistons;
 an aft puller attached to the aft set of double acting pistons; and
 wherein the aft and forward pullers each contain a pair of cable engaging jaws.

15. The cable pulling device of claim 14, wherein the double-acting pistons are configured to move the cable pullers simultaneously inwardly on an inward stroke and outwardly on an outward stroke.

16. The cable pulling device of claim 15, wherein the cable engaging jaws on the forward puller engage and pull the cable through the pipe on the inward stroke and wherein the cable passes freely through the cable engaging jaws of aft puller on the inward stroke.

17. The cable pulling device of claim 15, wherein the cable engaging jaws on the after puller engage and pull the cable through the pipe on the outward stroke and wherein the cable passes freely through the cable engaging jaws of the forward puller on the outward stroke.

18. The cable pulling device of claim 15, wherein each puller has a hinged door under which reside the cable engaging jaws, wherein the door may be swung open to install the cable to be pulled and may be closed and locked into place thereafter.

19. The cable pulling device of claim 14, wherein the double acting cylinders are activated by pressurized hydraulic fluid.

20. A cable pulling device for the trenchless replacement of underground pipe, comprising:
 a mole;
 a length of cable, the cable being engagable to the mole a cable pulling device being releaseably engagable to the cable;
 a cable pulling device mounting frame, the frame being attachable to the pulling device;
 wherein the cable pulling device includes
 a cylinder body;
 the cylinder body containing a forward set of double-acting pistons and an aft set of double acting pistons;
 a forward puller attached to the forward set of double-acting pistons;
 an aft puller attached to the aft set of double acting pistons;
 wherein the aft and forward pullers each contain a pair of cable engaging jaws; and
 wherein the double-acting pistons are configured to move the pullers simultaneously inwardly on an inward stroke and outwardly on an outward stroke.

* * * * *